United States Patent [19]

Ford, Jr. et al.

[11] 4,444,471
[45] Apr. 24, 1984

[54] VARIABLE FOCUS LENS SYSTEM EMPLOYING ELASTOMERIC LENS

[75] Inventors: John W. Ford, Jr., Framingham; Howard G. Rogers, Weston; Christy P. Thomas, Sharon, all of Mass.

[73] Assignee: Polaroid Corporation, Cambridge, Mass.

[21] Appl. No.: 357,838

[22] Filed: Mar. 12, 1982

[51] Int. Cl.³ .......................... G02B 1/04; G02B 3/12; G02B 15/14
[52] U.S. Cl. ...................... 350/423; 350/419
[58] Field of Search .............. 350/423, 427, 418, 419

[56] References Cited

U.S. PATENT DOCUMENTS

| 60,109 | 11/1866 | Woodward | 350/418 |
|---|---|---|---|
| 504,890 | 9/1893 | Ohmart | 126/440 |
| 708,365 | 9/1902 | Kliegl et al. | 350/419 |
| 1,269,422 | 6/1918 | Gordon | 350/419 |
| 2,165,078 | 7/1939 | Toulon | 350/419 |
| 2,269,905 | 1/1942 | Graham | 350/419 |
| 2,300,251 | 10/1942 | Flint | 350/419 |
| 3,161,718 | 12/1964 | DeLuca | 350/419 |

OTHER PUBLICATIONS

Caudell et al., "Active Optics with RTV Silicone Rubber" *SPIE*, vol. 115, Advances in Replicated & Plastic Optics, pp. 18-24.

*Primary Examiner*—John K. Corbin
*Assistant Examiner*—Scott J. Sugarman
*Attorney, Agent, or Firm*—Francis J. Caufield

[57] ABSTRACT

A variable focus lens system comprising an elastomeric, integrally molded, optical member and mounting arrangements therefor by which the axial position and the shape of a central lens part of the optical member can be changed in correspondence with one another to provide the lens system with focusing action over a predetermined range.

11 Claims, 4 Drawing Figures

VARIABLE FOCUS LENS SYSTEM EMPLOYING ELASTOMERIC LENS

BACKGROUND OF THE INVENTION

1. Field of the Invention

This invention in general relates to variable focus lens systems and in particular to such systems having an elastomeric lens element and mounting arrangements therefor by which the focus of the lens element can be selectively changed over a predetermined range.

2. Description of the Prior Art

Several types of variable focus lens systems are well-known in the optical arts. The type most commonly found in practice perhaps is the multielement glass lens that is optically structured so that its focus can be selectively varied by changing the axial air spacing between its elements through the use of movable mechanical lens mounts.

Another type of variable focus lens system utilizes a pair of optical refracting plates having surfaces which are specially configured to in combination selectively define spherical lenses having different focal lengths as the plates are displaced with respect to one another transverse to their respective optical axis. As an example of this type lens, reference may be had to U.S. Pat. No. 3,305,294 issued to L. W. Alvarez on Feb. 21, 1967 and entitled "Two-Element Variable-Power Spherical Lens" or to U.S. Pat. No. 3,583,790 issued to James G. Baker on June 8, 1971 and entitled "Variable Power, Analytic Function, Optical Component In The Form Of A Pair Of Laterally Adjustable Plates Having Shaped Surfaces, And Optical Systems Including Such Components". Such refracting plate systems as is well-known may be used separately or in combination with other components to effect optical power changes for purposes of focusing and, as indicated in the Baker patent, supra, can also favorably correct aberrations as the plates are displaced.

Another known variable focus lens is the fluid or gas type. In this type, flexible transparent membranes or plates generally are mounted in a support housing to define one or more chambers which are filled with a fluid, gas or jelly having a suitable index of refraction. The pressure or volume of the contents of each chamber is adjusted so that the membranes or plates deform in a predictable manner and the fluid or other contents of the chamber assumes the interior shape of the chamber to define a lens. In the case where more than one chamber is utilized, it may be possible to correct for spherical and chromatic aberrations. Examples of these types of lenses are shown and described in U.S. Pat. No. 2,300,251 issued to E. F. Flint on Oct. 27, 1942 and entitled "Variable Focus Lens" and U.S. Pat. No. 3,161,718 issued to W. V. DeLuca on Dec. 15, 1964 and entitled "Variable Power Fluid Lens".

It is apparent that variable focus lenses are of fundamental importance in the practice of the optical arts as is evidenced by the various types which have been devised by those skilled in the art and discussed above. Equally apparent is the fact that each type of variable focus lens has advantages and disadvantages depending on the particular application. The fluid type lenses, for example, can be made quite large and can result in considerable savings in weight and space compared with a comparable glass system.

Because of the importance of the variable focus lens, it is a primary object of the present invention to provide for use in the optical arts a variable focus lens system employing an elastomeric type lens.

Another object of the invention is to provide a variable focus lens system using an elastomeric lens whose focus can be changed through either changes in its shape or axial displacement or both.

Other objects of the invention will in part be obvious and will in part appear hereinafter. The invention accordingly comprises the apparatus possessing the construction, combination of elements, and arrangement of parts which are exemplified in the detailed disclosure that follows.

SUMMARY OF THE INVENTION

This invention in general relates to variable focus lens systems and in particular to a variable focus lens system employing an elastomeric lens structured for use with mounting arrangements therefor by which either the shape of the lens can be selectively changed or its shape and axial position changed in correspondence with one another to selectively change the focus of the system over a predetermined range.

The variable focus lens system of the invention comprises a lens element formed of at least one transparent, homogeneous elastomeric material that is selectively shaped to provide it with a predetermined focus when the lens element is in a relaxed or nearly relaxed state.

Also included are means for supporting the lens element along and perpendicular to its optical axis and for applying radial tensile stress around the periphery of the lens element in response to the application of force to selected parts of the support means in directions parallel to the lens element optical axis.

Means are also provided for applying a selectively variable force to the selected parts of the support means in directions parallel to the lens element optical axis and substantially uniformly distributed about the optical axis to provide a selectively variable radial stress uniformly distributed around the periphery of the lens element to alter the relaxed shape of the lens element in a predetermined manner so that the focus of the lens element can be changed in a continuous manner over a predetermined range.

Support means structure is also disclosed for selectively displacing the lens element along its optical axis responsive to the application of the variable axial force and in correspondence with changing the lens element focus by changing its shape to further control the focus of the lens system.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiments when read in connection with the accompanying drawings wherein like numbers have been employed in the different figures to denote the same parts and wherein:

DESCRIPTION OF THE PREFERRED EMBODIMENT

Figure 1:
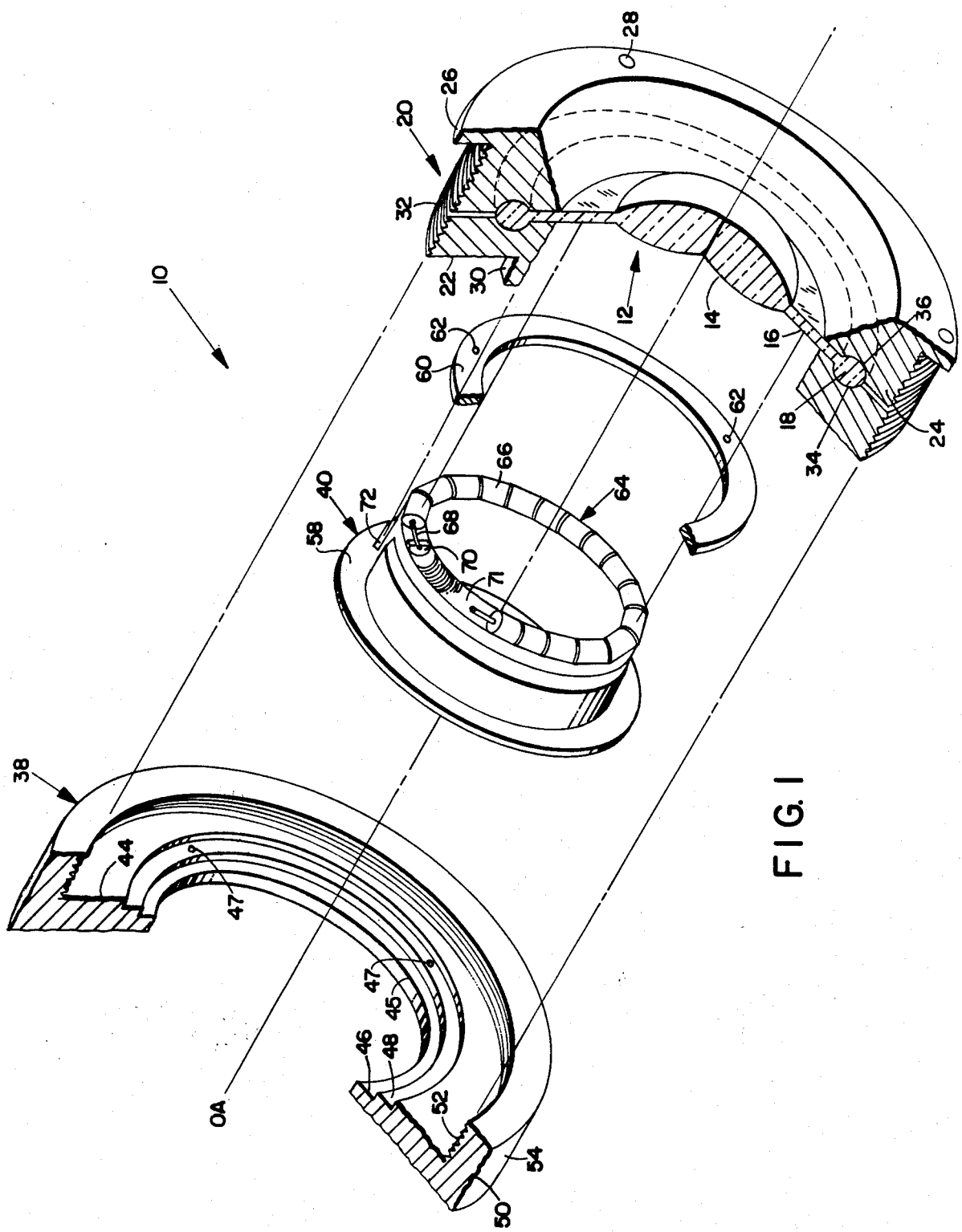
FIG. 1 is an exploded perspective view of the preferred embodiment of the lens system of the invention shown with parts broken away.

The preferred embodiment of the variable focus lens system of the invention is designated at 10 in FIG. 1. As can be seen by referring to FIGS. 1 and 2, the lens system 10 comprises four major elements, an intregally formed, elastomeric optical member 12, a generally circularly shaped, two-part clamp 20, a circular bezel 38, and a cylindrical tubular member 40. These four major elements cooperate in a manner to be described to selectively alter the focus of the lens system 10 so that it can be used to image over a predetermined range of object distances.

The optical member 12 is a three-part structure comprising a central lens element 14, a circular flexible membrane 16 extending radially outward from the periphery of the lens element 14, and a circular toroidal edge 18 surrounding the circumferential edge of the membrane 16. All three parts of the optical member 12 are preferably integrally molded of a transparent, homogeneous elastomeric material, preferably a silicone rubber compound or the like having a suitable index of refraction, 1.4 or greater; optical clarity; and resistance to changes in its elastomeric properties over as wide a temperature range as possible.

Figure 2:
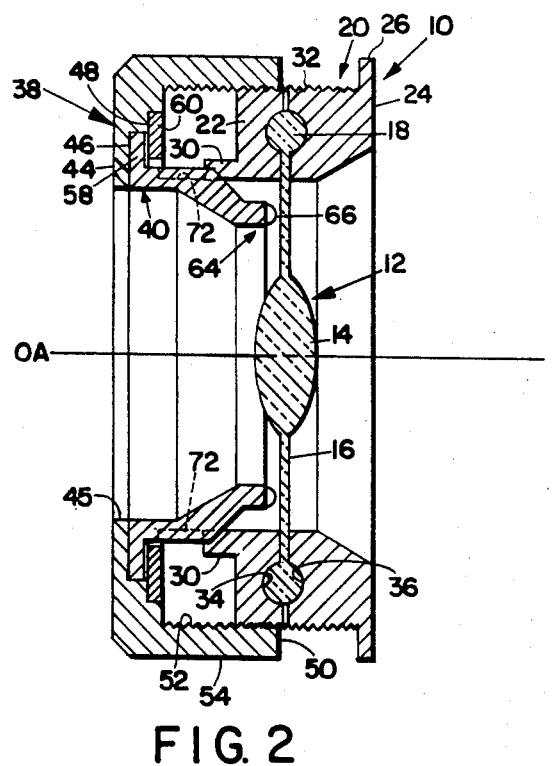
FIG. 2 is a vertical cross-sectional view of the lens system of FIG. 1 taken with the parts thereof assembled in one position.

The central lens element 14 is preferably formed in the shape of a positive, biconvex lens of predetermined dioptric power or focal length to provide the lens system 10 with a predetermined focus when the lens element 14 is in a relaxed or nearly relaxed state as shown in FIG. 2.

The clamp 20, which serves in part as a mounting means for the optical member 12, includes a forward section 22 and a rear section 24 each of which is provided with a semicircular groove, 34 and 36 respectively. The grooves, 34 and 36, are dimensioned to receive and trap the optical member toroidal edge 18 between them with the clamp front and rear sections, 22 and 24, fastened together which may be done in a conventional manner. Preferably the radial dimensions from the lens element optical axis, OA, to the respective centers of the toroidal edge 18 and the circular groove formed by the clamp 20 are selected so that there is a slight tension transmitted to the peripheral edge of the lens element 14 via the membrane 16 to assure that the lens element 14 has a given shape and is supported at a predetermined location along and perpendicular to its optical axis, OA, under this condition of relaxation or near relaxation.

In the foregoing manner, the optical member central dioptric section 14 is supported by resilient means, i.e., the membrane 16, along and perpendicular to the optical axis, OA. In a manner to be described, the member 16 also is structured for applying radial tensile stress around the lens element periphery in response to the application of force to the membrane 16 in a direction parallel to the lens element optical axis, OA, to change the shape and hence the focal length of the lens element 14 and operates also to displace the optical member central lens element 14 along its optical axis, OA, for purposes of selectively varying the focus of the lens system 10 to facilitate changing the back focal distance of the lens element 14.

To mount the lens system 10 in a fixed manner, the clamp rear section 24 includes a flange 26 having mounting holes 28 therethrough. Thus structured, the lens system 10 can be attached to a support structure as, for example, a camera body.

The manner in which an axial force is applied to the membrane 16 to selectively stretch the central lens element 14 to change its shape and to displace the lens element 14 along its optical axis, OA, may best be understand by now describing the structure and operation of the remaining major elements of the lens system 10. Referring now to FIG. 1, it can be seen that the bezel 38 comprises an inner disc section 44 having an aperture 45 therein dimensioned to provide an unrestricted opening through which light can travel towards the lens element 14. The aperture 45 is counterbored to provide two surrounding concentric circular recesses, 46 and 48, having different axial depths and diameters. Extending rearwardly from the inner disc section 44 is a cylindrical tubular section 50 of given diameter and wall thickness. The inner surface of the cylindrical section 50 is provided with threads 52 which mate with those designated at 32 on the exterior circumferential surface of the clamp 20. The outside circumferential surface (54) of the cylindrical section 50 may be provided with either serrations or gearing to either facilitate manual rotation of the bezel 38 about the optical axis, OA, or to serve as a means by which the bezel 38 can be rotated via the use of a suitable motor driven gear.

The tubular section 40 includes a forwardly facing flange 58 that is dimensioned to fit into the recess 46 and is retained therein by a circular retaining ring 60 which fits into the recess 48 and is held in place therein via conventional fasteners. The fasteners for this purpose insert through holes 62 in the retaining ring 60 and thereafter into threaded holes 47 which are correspondedly positioned in the recess 48. The recesses, 46 and 48, the retaining ring 60, and the tubular section flange 58 are dimensioned to provide a sliding fit between the flange 58 and the bezel 38 so that the bezel 38 and the tubular section 40 can be rotated relative to one another.

In the forward edge of the tubular member 40 there is a circumferential semicircular groove 71. Extending outwardly from the semicircular groove 71 there are a series of equally spaced cantilevered mounts 70 (only one shown) each of which is adapted to have snapped therein a closed wire 68 on which there is mounted a plurality of short rollers 66. The wire serves as an axle for each one of the rollers 66 so that each may freely turn about its own axis of rotation within the semicircular groove 71. In this manner, the forward edge of the tubular member 40 is provided with a low friction capability.

Figure 3:
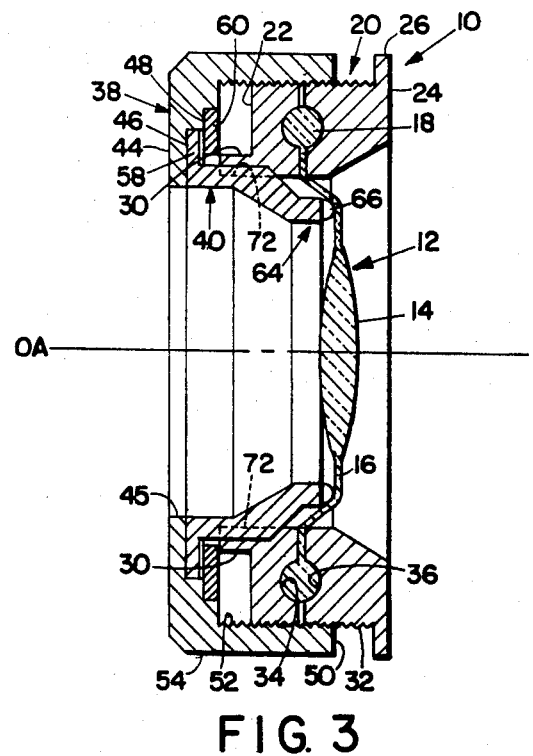
FIG. 3 is a view similar to FIG. 2 showing the assembled lens system parts positioned differently than in FIG. 2.

On the outer surface of the tubular member 40 there are two grooves 72 which are spaced 180-degrees apart (see FIG. 2) into which slidably fit a corresponding pair of tongues 30 extending forwardly parallel to the optical axis, OA, from the clamp front section 22. With this arrangement, clockwise rotation of the bezel 38 about the optical axis, OA, causes the tubular member 40 to displace axially along the optical axis, OA, so that the forward edge of the tubular member 40, comprising the rollers 66, contacts the flexible membrane 16 at a predetermined radial distance away from the peripheral edge of the lens element 14. This tongue and groove arrangement prevents the tubular member 40 from rotating about the optical axis, OA, and the slidable fit provided between the flange 58 and the bezel 38 allows the flange 58 to freely rotate with respect to the bezel 38 so that rotatory motion of the bezel 38 moves the tubular member 40 only along the optical axis, OA. As the tubular member 40 is displaced along the optical axis, OA, its leading edge operates to apply a selectively variable force to the membrane 16 in directions parallel to the optical axis, OA. This axial force is substantially uniformly distributed about the optical axis, OA, and operates to stretch or deform the membrane 16 creating in it a radial stress. The radial stress thus created is uniformly distributed about the periphery of the lens element 14 and operates to alter its relaxed shape (see FIG. 3) in a predetermined manner so that the focal length of the lens element 14 can be changed in a continuous manner over a predetermined range. With this arrangement, the shape of the lens element 14 is changed from a short focal length lens as best shown in a relaxed state in FIG. 2 to a lens having a longer focal length as shown in FIG. 3. Also, the lens element 14 is axially displaced rearwardly from its initial relaxed position as it is radially stretched. Thus, twofold control over the focus of the lens system 10 is provided. The first control is an alteration in the shape of the lens element 14 to change its focal length; and the second is a change in the axial position of the lens element 14 to enable its back focal distance to be changed.

ALTERNATE EMBODIMENT

Figure 4:
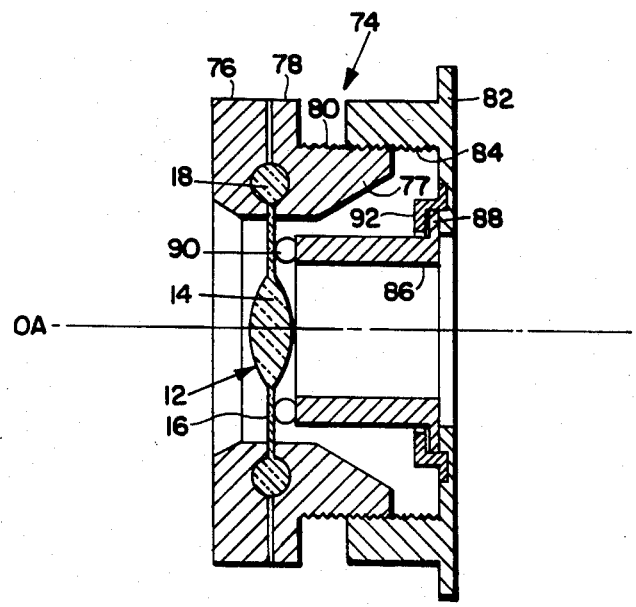
FIG. 4 is a vertical cross-sectional view for an alternate embodiment of the invention.

Referring now to FIG. 4, there is shown in elevated cross section an alternate embodiment for the variable focus lens system of the invention. The alternate embodiment, designated at 74 in FIG. 4, operates in a manner to be described to change only the shape of the central lens element 14 without axially displacing it along its optical axis, OA. This may best be understood by referring now to FIG. 4 wherein it can be seen that the alternate lens system 74 comprises the optical member 12 structured as before, a clamping arrangement therefor similar to that described in the preferred embodiment and comprising a pair of circular clamping sections including a forward section 76 and a rearward section 78. The forward section 76 and the rearward section 78 are structured as in the case of the preferred embodiment to retain the optical member toroidal edge 18 between them when the forward and rearward sections, 76 and 78, are fastened to one another. The rear section 78 has a necked-down section 77 having threads 80 thereon which are configured to fit into a complementary configured threaded section 84 which projects forwardly from a circular mounting member 82. The mounting member 82 is intended to be fixed in place on a support member (not shown) which may be, for example, a camera body.

In the case of the alternate embodiment, the clamping arrangement described serves as a bezel because clockwise rotation of it about the optical axis, OA, axially displaces the optical member 12 rearwardly along the optical axis, OA.

A cylindrical tubular member 86 is provided with rollers 90 positioned on its forwardly facing edge in the manner previously described. At the rear edge of the cylindrical member 86, there is a flange 88 which is slidably mounted with respect to the rear mount 82 via a retaining ring 92. The tubular member 86 and the clamp are preferably coupled for rotation with one another so that only axial loads are transmitted to the membrane 16. Thus, displacement of the optical member 12 rearwardly along the optical axis, OA, causes the rollers 90 to produce an axial force on the membrane 16. This axial force causes a radial stress to be uniformly distributed about the periphery of the lens element 14 to stretch the lens element 14 to reduce its focal length in the manner previously described. However, the lens element 14 in this case does not itself displace along the optical axis, OA, but rather only changes its shape at a predetermined axial location along the optical axis, OA.

It will be obvious to those skilled in the art that other changes may be made in the above-described embodiments without departing from the scope of the invention. For example, the central lens element 14 of the invention may have other initial relaxed cross-sectional shapes which can thereafter be stretched to take on other shapes. Therefore, it is intended that all matter contained in the above description or shown in the accompanying drawings shall be interpreted as illustrative and not in a limiting sense.

What is claimed is:

1. A variable focus lens system comprising:
    a lens element formed of at least one transparent, homogeneous elastomeric material selectively shaped to provide said lens element with a predetermined focus when said lens element is in a relaxed state;
    means for supporting said lens element in a relaxed or nearly relaxed state along and perpendicular to its optical axis and for creating a radial tensile stress uniformly distributed around the periphery of said lens element in response to the application of force to selected parts of said support means in directions parallel to said lens element optical axis; and
    means for applying a selectively variable force to said selected parts of said support means in directions parallel to said lens element optical axis and substantially uniformly distributed about said optical axis to cause said radial stress uniformly distributed around the periphery of said lens element to be selectively variable to selectively alter said relaxed shape of said lens element in a predetermined manner so that the focus of said lens element can be changed in a continuous manner over a predetermined range.

2. The lens system of claim 1 wherein said support means is further structured for selectively displacing said lens element along its optical axis responsive to said variable force and in correspondence with changing the focus of said lens element by changing its shape to further control the focus of said lens element.

3. A variable focus lens system comprising:
    a lens element formed of at least one transparent, homogeneous elastomeric material selectively shaped to provide said lens element with a predetermined focus when said lens element is in a relaxed state;
    mounting means;
    resilient means attached to said mounting means and around the periphery of said lens element, extending generally radially outward therefrom to said mounting means, for supporting said lens element in a relaxed or nearly relaxed state along and perpendicular to its optical axis and for creating a radial tensile stress uniformly distributed around said lens element periphery in response to the application of force to said resilient means in directions parallel to said lens element optical axis; and means for applying a selectively variable force to said resilient means in directions parallel to said lens element optical axis and substantially uniformly distributed about said optical axis to cause said radial stress uniformly distributed around the periphery of said lens element to be selectively variable to selectively alter said relaxed shape of said lens element in a predetermined manner so that the focus of said lens element can be changed in a continuous manner over a predetermined range.

4. The lens system of claim 3 wherein said resilient means, said mounting means, and said force applying means are further structured and arranged for selectively displacing said lens element along its optical axis, in correspondence with changing the focus of said lens element by changing its shape, to further control the focus of said lens element.

5. The lens system of claim 3 wherein said lens element is rotationally symmetric about its optical axis, has a circular shape when viewed along its optical axis, and wherein said resilient means comprises a thin, circular membrane composed of an elastomeric material.

6. The lens system of claim 5 wherein said circular membrane is integrally formed with said lens element and of the same material as that comprising said lens element.

7. The lens system of claim 6 wherein the outer edge of said membrane comprises a circular toroid also integrally formed with said lens element and of the same material as that comprising said lens element and wherein said mounting means includes means for clamping around said disk toroidal edge to uniformly support said lens element while in its relaxed shape or nearly relaxed state.

8. The lens system of claim 5 wherein said force applying means comprises:

(a) a circular tube of predetermined diameter and wall thickness and having one end thereof adapted to slidably engage said circular membrane; and (b) means for selectively displacing said circular tube along said lens element optical axis in axially alignment therewith and relative to said circular membrane to selectively deform said circular membrane in a rotationally uniform manner at a predetermined radial distance from said lens element optical axis whereby said circular membrane operates to provide said selectively variable radial tensile stress uniformly distributed around said lens element periphery.

9. The lens system of claim 7 wherein said force applying means comprises a circular tube of predetermined diameter and wall thickness and having one end thereof adapted to slidably engage said circular membrane and wherein said lens element mounting means is further structured to move said lens element relative to said circular tube along said lens element optical axis to selectively deform said circular membrane in a rotationally uniform manner at a predetermined radial distance from said lens element optical axis and at a predetermined location along said lens element optical axis to effect focus changes by changing the shape of said lens element only at said predetermined location.

10. The lens system of claim 8 wherein said lens element mounting means is adapted for stationing fixturing and wherein said force applying means is adapted for movement relative to said mounting means so that said circular tube displaces said lens element along the optical axis, while also inducing in it said radial tensile stress whereby the focus of said lens element is determined by its shape and its location along its optical axis.

11. The lens system of claim 8 wherein said slidably engageable edge of said circular tube comprises a plurality of rollers arranged end-to-end around the circumference of said circular tube one end with their axes of rotation generally tangential to the radial direction of said circular tube and perpendicular to said lens element optical axis.

* * * * *